(12) United States Patent
Tacklind

(10) Patent No.: US 6,591,510 B2
(45) Date of Patent: Jul. 15, 2003

(54) METHOD AND APPARATUS FOR SECURING AND ALIGNING BUBBLE VIALS

(75) Inventor: Christopher Andrew Tacklind, Palo Alto, CA (US)

(73) Assignee: Toolz, Ltd., Kowloon (HK)

( * ) Notice: Subject to any disclaimer, the term of this patent is extended or adjusted under 35 U.S.C. 154(b) by 0 days.

(21) Appl. No.: 09/858,710

(22) Filed: May 16, 2001

(65) Prior Publication Data

US 2001/0045020 A1 Nov. 29, 2001

Related U.S. Application Data

(60) Provisional application No. 60/205,845, filed on May 19, 2000.

(51) Int. Cl.$^7$ ................................................. G01C 9/28
(52) U.S. Cl. ........................................... 33/379; 33/384
(58) Field of Search .......................... 33/365, 377, 378, 33/379, 381–389

(56) References Cited

U.S. PATENT DOCUMENTS

| | | | |
|---|---|---|---|
| 1,292,969 A | | 1/1919 | Sturgis |
| 1,583,957 A | | 5/1926 | Carrier |
| 2,557,291 A | | 6/1951 | Hubbard |
| 3,069,539 A | | 12/1962 | Kidd |
| 3,186,100 A | | 6/1965 | Nakano |
| 3,561,128 A | | 2/1971 | Ostrager |
| 5,029,051 A | * | 7/1991 | Shirai et al. ................... 33/365 |
| 5,207,004 A | * | 5/1993 | Gruetzmacher ............... 33/382 |
| 5,208,990 A | * | 5/1993 | Woerlein ...................... 33/379 |
| 5,506,759 A | | 4/1996 | Shirai et al. |
| 6,243,957 B1 | * | 6/2001 | Gruetzmacher, Jr. et al. . 33/379 |

* cited by examiner

Primary Examiner—Diego Gultierrez
Assistant Examiner—Yaritza Guadalupe
(74) Attorney, Agent, or Firm—Vierra Magen Marcus Harmon & DeNiro LLP

(57) ABSTRACT

An apparatus and method for securing and aligning level indicators such as bubble vials includes the use of a spring structure with a screw adjuster. In some embodiments, multiple spring structures are positioned perpendicular to one another to allow precise adjustment in different planes. The spring structure is economical to manufacture, and allows accurate adjustment of levels placed in equipment having imprecisely bored holes.

29 Claims, 5 Drawing Sheets

METHOD AND APPARATUS FOR SECURING AND ALIGNING BUBBLE VIALS

CLAIM OF PRIORITY

The present application claims priority to U.S. Provisional Patent Application Ser. No. 60/205,845, entitled "Method and Apparatus for Securing and Aligning Bubble Vials", filed on May 19, 2000.

BACKGROUND OF THE INVENTION

1. Field of the Invention

The invention relates broadly to the field of leveling devices used in, by way of example only, the construction industry. More particularly, the present invention relates to an improvement in the assembly of leveling devices that allows for precise adjustment or calibration of the leveling device, using economical manufacturing methods.

2. Description of the Related Art

In construction leveling devices, as well as other leveling devices, a small plastic or glass bubble vial is often used for a direct indication of level. The vial is mounted in the leveling device, such as a rail or other piece of equipment. A user identifies a level line by manipulating the leveling device until a small bubble in the vial is centered between two marks. Bubble vials have a range of features including specific sensitivity and accuracy. Multiple vials may be used to indicate level in multiple planes or particular set angles, such as 45 degrees.

In the manufacture and assembly of bubble vial leveling devices, the bubble vial is precisely aligned with respect to a gauging surface, to ensure accuracy of the device. Manufacturers typically employ one of three approaches for aligning bubble vials: (a) press fitting, (b) fixture positioning and gluing, or (c) providing for user adjustment.

In press fitting, manufacturers press fit plastic vials into a drilled or reamed hole. The hole is precisely bored with respect to the gauging surface, and does not allow for subsequent adjustment of the vial's angle. In some instances, manufacturers use epoxy or glue to secure the vial's fit.

In fixture positioning, manufacturers employ a mounting fixture to position a bubble vial in a bored holding cavity. In this approach, the holding cavity is less precisely bored than in press fitting. Once the vial is correctly positioned, the manufacturer secures the vial with glue or epoxy and removes the fixture.

As a third approach, manufacturers may fix the vial in a separate holder, such as a die-cast aluminum tray. The holder is then fixed with screws and springs. This allows users to adjust or calibrate the vial. If adjustment is desired in two planes, then a more complex holder is needed. The disadvantage of this method of creating adjustable vials is its extra cost of manufacturing, size, and complexity.

Alternatively, manufacturers may mount a vial in a machined hole having an oval slot on each end with counterlocking screws mounted on axes perpendicular to each other. This allows independent calibration in two planes. This arrangement, however, is difficult to machine in the practical configurations of a leveling device's rail.

SUMMARY OF THE INVENTION

The invention described herein relates to a leveling device having an adjustable level indicator. Embodiments of the present invention provide for economical manufacture of adjustable levels by allowing a vial, or other level indicator, to be fitted into a loose extruded or imprecisely bored hole. The vial, or other level indicator, is then calibrated or adjusted to ensure operational accuracy.

One embodiment of the present invention includes a spring structure for securing a level indicator and a screw for adjusting the indicator's position. The spring structure is mounted in a cavity in a leveling device. The spring structure includes two flexible elongated members that are deflected by the cavity's walls. The elongated members place a resultant force on the level indicator to secure the indicator's position in the cavity.

The screw extends into the cavity to apply an adjustment force to the level indicator. The adjustment force directs the level indicator to a position that results in a level indication when the leveling device is placed on a gauging surface. In one embodiment, the adjustment force is applied to align the level indicator's centerline with the cavity's centerline. The use of the spring structure and screw avoids the need to precisely extrude the cavity for holding the level indicator.

In one embodiment, multiple combinations of a spring structure and screw are employed to provide for adjustments in multiple planes. A first spring structure and screw secure a first end of a bubble vial and a second spring structure and screw secure a second end of the bubble vial. In one such embodiment, the first spring structure and second spring structure are positioned perpendicular to each other within the leveling device bore. This provides for the level indicator to be adjusted in two independent orthogonal planes—allowing precise calibration and operational accuracy of the leveling device with regard to all sides of the rail.

These and other objects and advantages of the present invention will appear more clearly from the following description in which the preferred embodiment of the invention has been set forth in conjunction with the drawings.

BRIEF DESCRIPTION OF THE DRAWINGS

FIG. 1b shows an end representation of the spring structure of FIG. 1a.

DETAILED DESCRIPTION

Figure 1A:
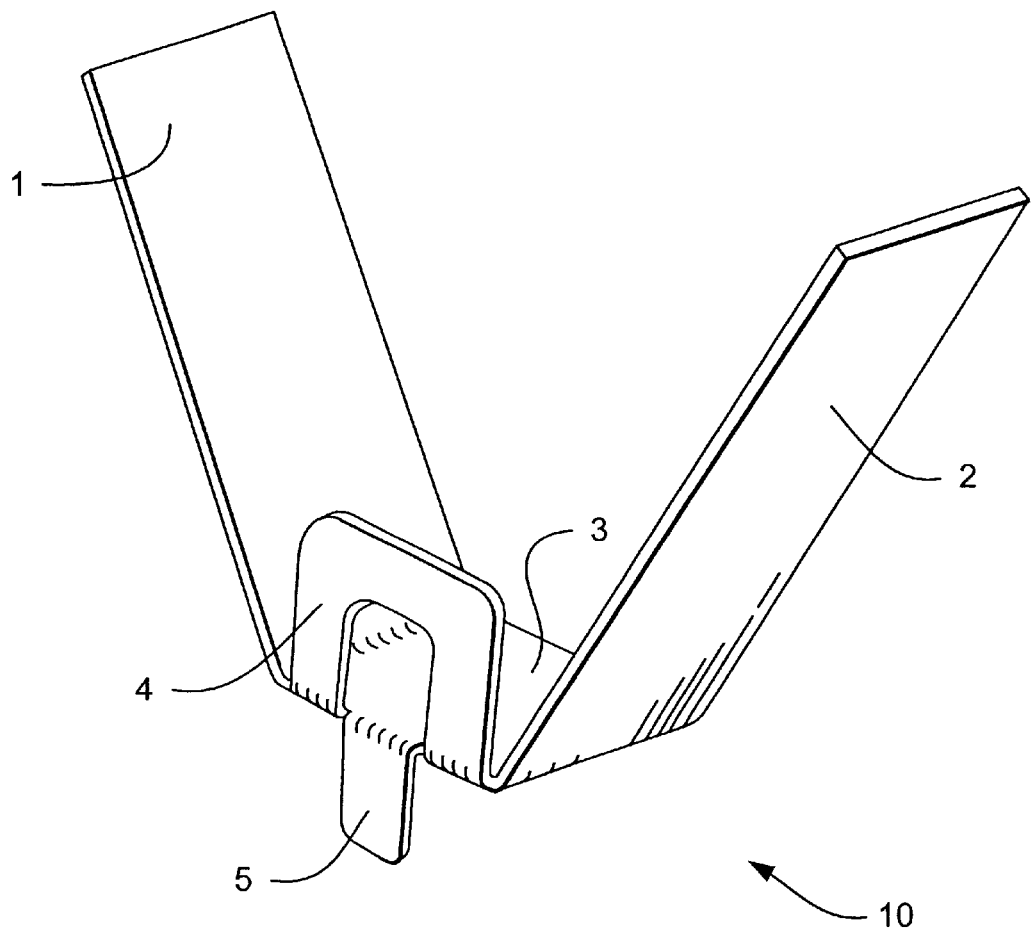
FIG. 1a shows one embodiment of a spring structure in accordance with the present invention.

FIG. 1a illustrates one embodiment of a spring structure in accordance with the present invention. Spring structure 10 is substantially rigid, but has some degree of planar flexibility and elasticity. In one embodiment, spring structure 10 is fabricated from sheet metal using conventional laser cutting or die tooling methods. Spring structure 10 can also be manufactured from other materials that exhibit flexibility and elasticity and still remain within the spirit and scope of the invention. For example, a wire form can be employed instead of sheet metal.

Spring structure 10 includes elongated members 1 and 2, each extending symmetrically from base 3. In one embodiment, elongated members 1 and 2 extend from base 3 at an acute angle. As explained above for spring structure 10, elongated members 1 and 2 are manufactured to be substantially rigid, but to have a degree of planar flexibility.

Two smaller tab-like members also branch off base 3: retaining tab 4 pointing inwards toward the center of spring structure 10, and fixing tab 5 pointing outwards away from spring structure 10.

Figure 1B:
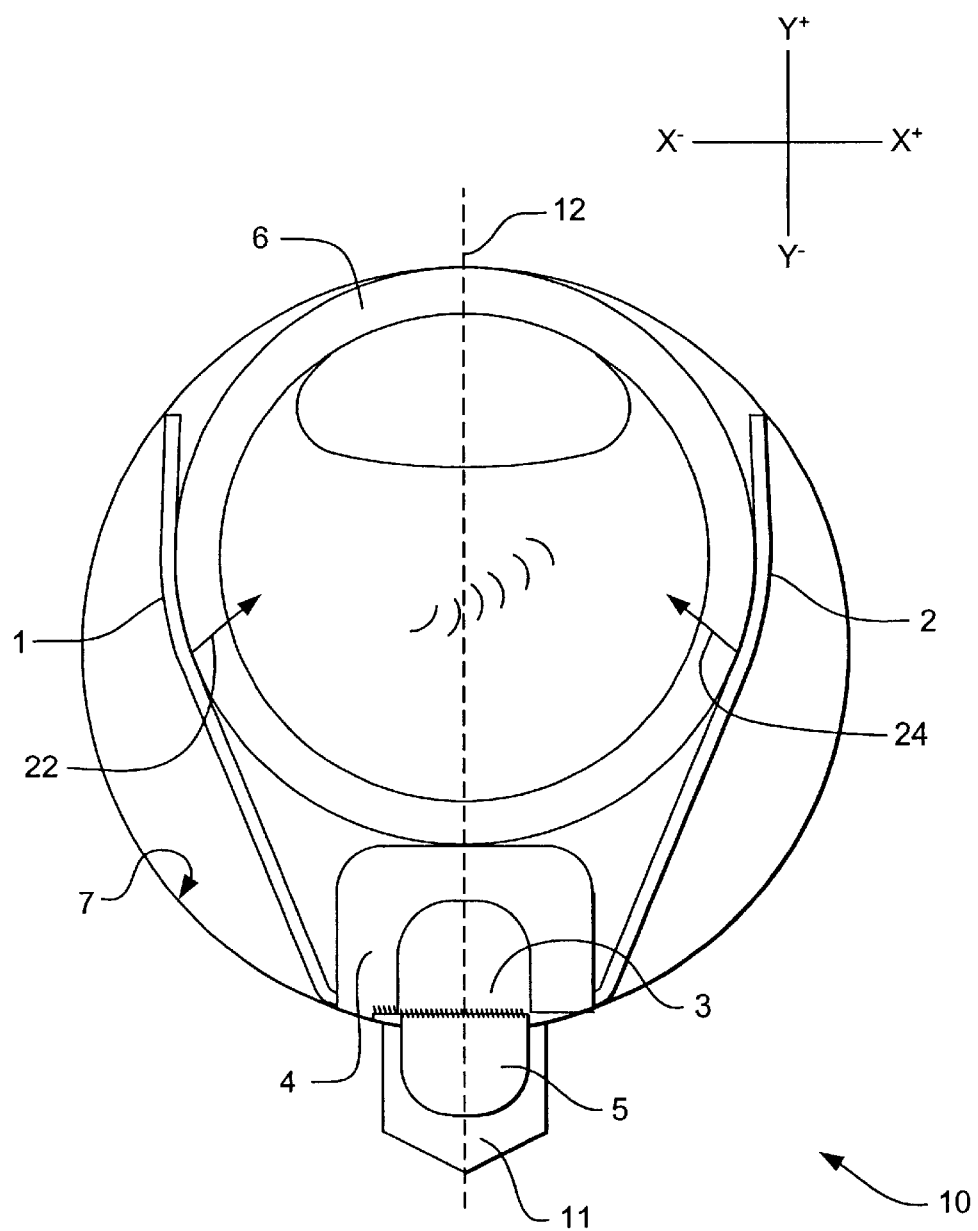

FIG. 1b shows an end view of spring structure 10 in use in one embodiment of the present invention. FIG. 1b shows extruded hole 7, which forms a cavity in a leveling device for mounting level indicator 6. In one embodiment, level indicator 6 is a bubble vial. Spring structure 10 is manufactured for insertion into hole 7 to secure vial 6.

Base 3 contacts the interior surface of hole 7. Elongated members 1 and 2 press against the interior surface of hole 7 and are deflected from their original state. Bubble vial 6 is placed between elongated members 1 and 2. As a result, elongated members 1 and 2 take on a bowed shape. In one embodiment, hole 7 is circular with a diameter of 12 millimeters ("mm"), and vial 6 measures 9 mm in diameter.

Elongated members 1 and 2 of spring structure 10 produce uniform forces against vial 6. The forces keep vial 6 securely positioned in hole 7 and minimize undesired movement. The force from member 1, represented by vector 22, includes a component directed along the y-axis in a positive direction and a component directed along the x-axis in a positive direction. The force from member 2, represented by vector 24, includes a component directed along the y-axis in a positive direction and a component directed along the x-axis in a negative direction. In one embodiment, the forces from members 1 and 2 create a resultant force on vial 6 directed to keep vial 6 pressed against the interior wall of hole 7. As a result, the center of vial 6 aligns with centerline 12 of hole 7.

Retaining tab 4 is sized to allow bubble vial 6 to pass through spring structure 10 during an insertion process. Once vial 6 is properly aligned in hole 7, retaining tab 4 prevents vial 6 from sliding through elongated members 1 and 2. Further details about retaining tab 4 will be explained below with reference to FIGS. 1c and 1d.

Fixing tab 5 is inserted into notch 11 in the interior surface of hole 7 to register spring structure 10. As a result, spring structure 10 is fixed in place and prevented from slipping from side-to-side or around bubble vial 6.

Figure 1C:
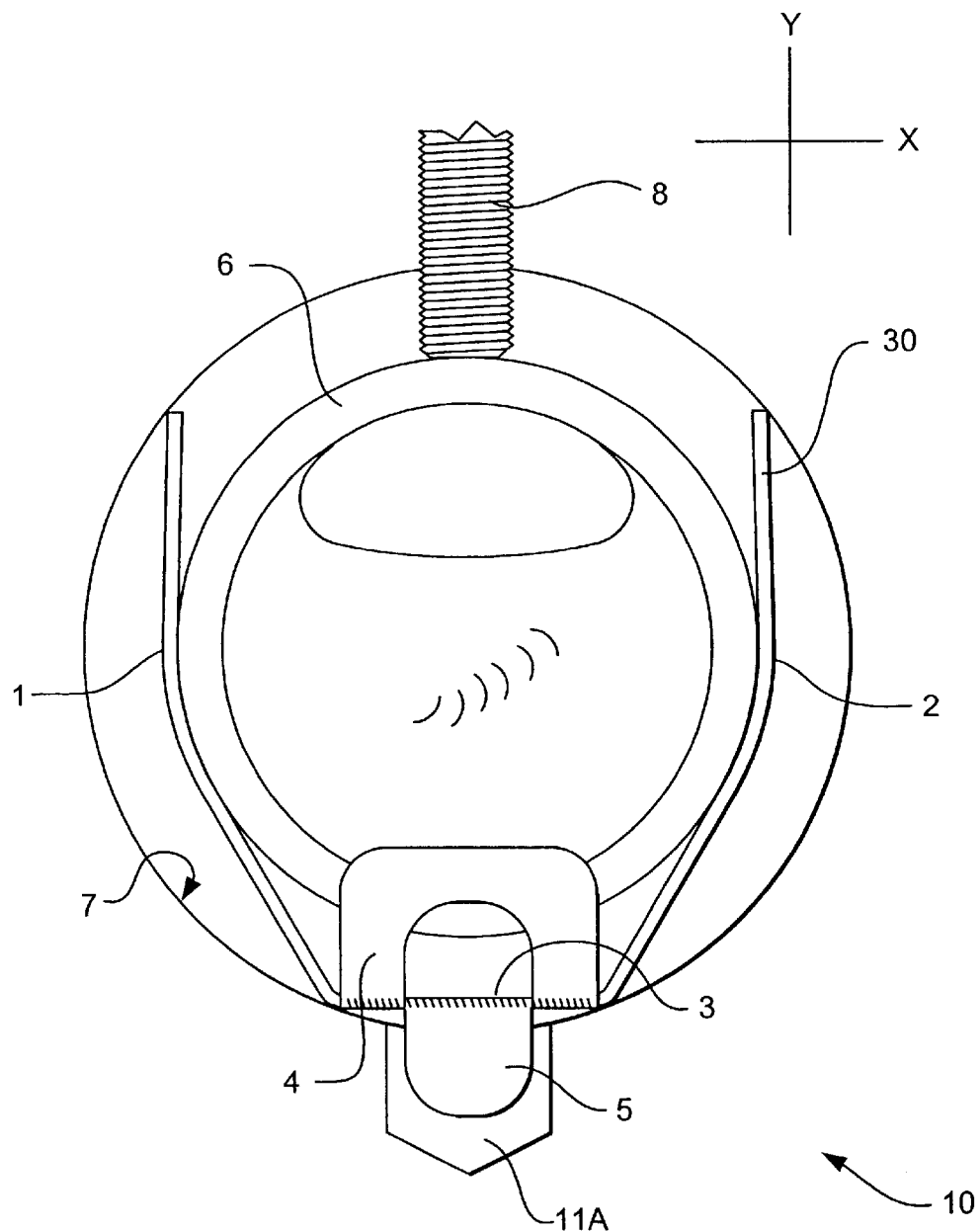
FIGS. 1c and 1d show cross-sectional representations of a pair of spring structure and screw combinations holding a level indicator in place.
Figure 1D:
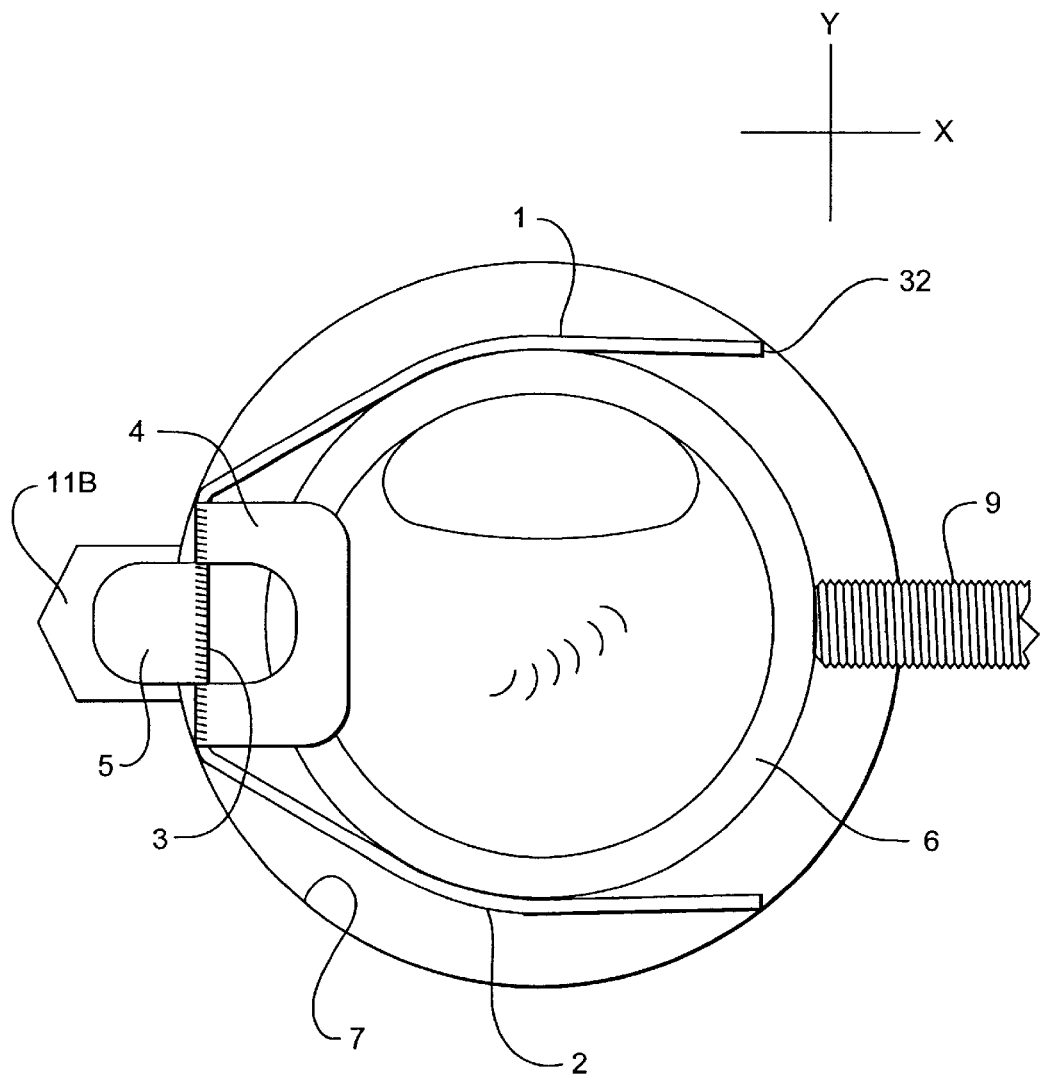

FIGS. 1c and 1d show one embodiment of the present invention in which two spring structures are employed in a leveling device to secure a bubble vial, or other level indicator. Vial 6 is located in hole 7 of a leveling device. FIG. 1c shows a cross-section of one end of vial 6 in hole 7 in the x-y plane. FIG. 1d shows a cross-section of the opposite end of vial 6 in hole 7 in the x-y plane. Spring structures 30 and 32 in FIGS. 1c and 1d are the same as spring structure 10 in FIG. 1b and include the same reference numbers.

The leveling device shown in FIGS. 1c and 1d also includes screw 8 (FIG. 1c) and screw 9 (FIG. 1d). Screws 8 and 9 extend through the interior wall of hole 7 and are used to adjust the alignment of vial 6. Screw 8 extends into hole 7 to contact vial 6 and apply a force in opposition to the force applied by spring structure 30. Screw 9 extends into hole 7 to contact vial 6 and apply a force in opposition to the force applied by spring structure 32. In one embodiment, screw 8 provides a force normal to base 3 of spring 30, and screw 9 provides a force normal to base 3 of spring 32. In other embodiments of the invention, the forces supplied by screws 8 and 9 are not normal to the spring structure bases.

When making the leveling device shown in FIGS. 1c and 1d, a manufacturer places spring structures 30 and 32 at opposite ends of hole 7. Fixing tab 5 on spring 30 is inserted through notch 11a in the interior wall of hole 7 to register spring structure 30. Fixing tab 5 on spring 32 is inserted through notch 11b in the interior wall of hole 7 to register spring structure 32. The manufacturer inserts bubble vial 6 between elongated members 1 and 2 of spring structure 30 (FIG. 1c) and between elongated members 1 and 2 of spring structure 32 (FIG. 1d).

Vial 6 is longer than the distance between spring 32 and the end of spring 30 that faces spring 32. During vial insertion, a manufacturer first slides vial 6 between members 1 and 2 of spring 30—beginning from the end of spring 30 closest to spring 32. In doing this, a first end of vial 6 passes through an opening formed by the interior wall of hole 7 and member 1, member 2, and retaining tab 4 of spring 30. retaining tab 4 of spring 30 is designed to allow for such clearance when screw 8 is retracted into the interior wall of hole 7. Retaining tab 4 in spring 32 is similarly designed for operation with screw 9.

Next, the manufacturer drops vial 6 completely into hole 7—sliding a second end of vial 6 between members 1 and 2 of spring 32 and retracting the first end of vial 6 back past retaining tab 4 of spring 30. Alternatively, a manufacturer can first insert vial 6 between member 1, member 2, and retaining tab 4 of spring 32.

In one embodiment, spring 30 is aligned orthogonal to spring 32. In such an embodiment, springs 30 and 32 are positioned so that base 3 of spring 30 is perpendicular to base 3 of spring 32. The resultant force applied to vial 6 by spring 30 is perpendicular to the resultant force applied to vial 6 by spring 32. The forces from springs 30 and 32 press respective portions of vial 6 against the interior wall of hole 7, as described above with reference to FIG. 1b.

The manufacturer employs screws 8 and 9 to provide adjustment forces against the forces from springs 30 and 32, respectively. The adjustment forces move vial 6 into a calibrated position in hole 7. When vial 6 is in a calibrated position, the vial provides a level indication when the leveling device is placed on a gauging surface. In one such embodiment, screws 8 and 9 position vial 6 toward the center of hole 7.

Retaining tab 4 on spring 30 is sized to prevent vial 6 from sliding between elongated members 1 and 2 on spring 30 when screw 8 forces vial 6 toward the center of hole 7. Retaining tab 4 on spring 32 is sized to prevent vial 6 from sliding between elongated members 1 and 2 on spring 32 when screw 9 forces vial 6 toward the center of hole 7.

Once vial 6 is in the calibrated position, the ends of vial 6 are potted in one embodiment of the present invention. The ends of vial 6 are potted in a silicone or similar Room Temperature Vulcanization compound. Potting the assembly in this manner provides stabilization from shock and vibration. Even when fully set, the potting compound remains flexible, so subsequent adjustment is possible using screws 8 and 9. Other potting materials can be used and be within the spirit and scope of the invention.

Figure 2:
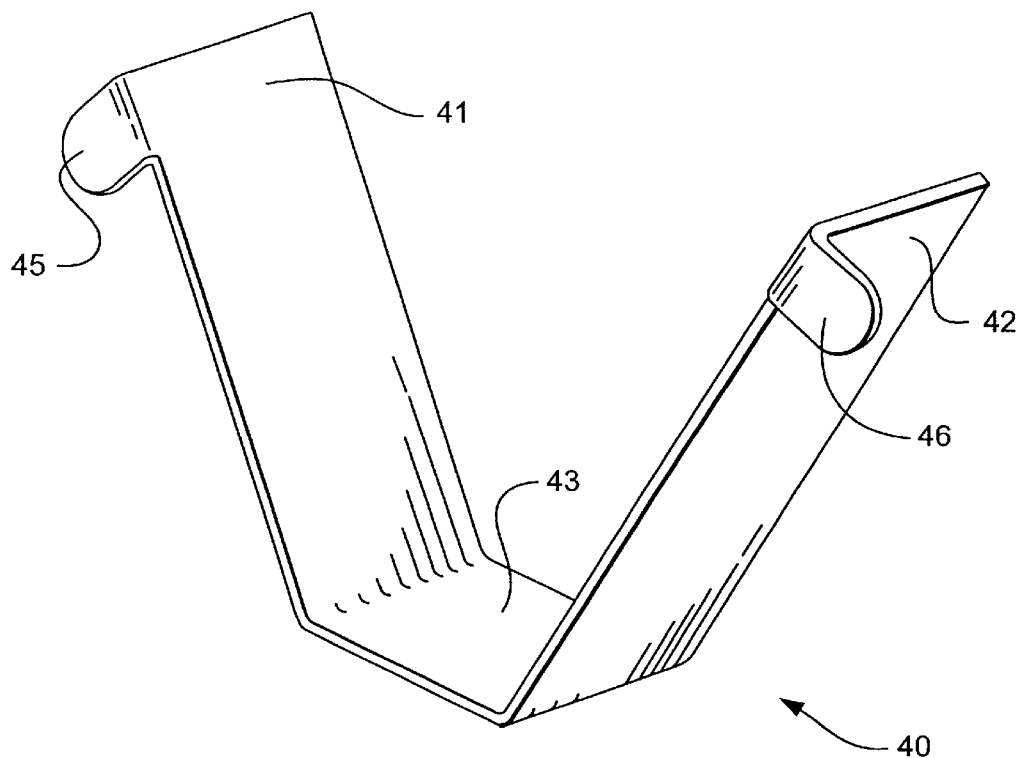
FIG. 2 shows an alternate embodiment of a spring structure in accordance with the present invention.
Figure 3:
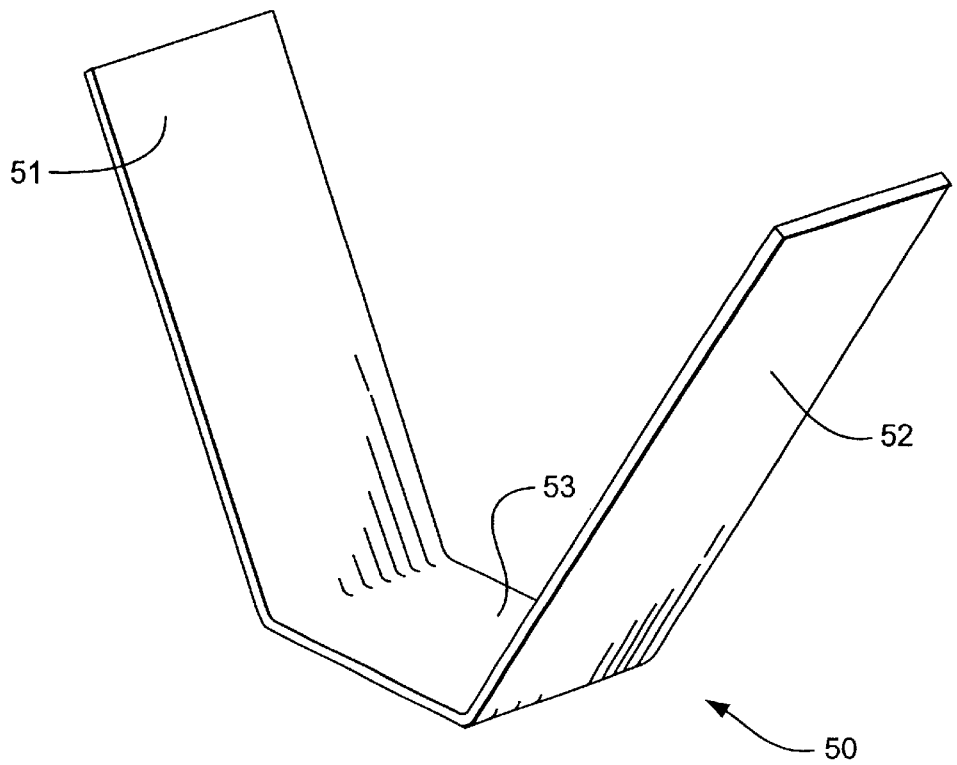
FIG. 3 shows yet another embodiment of a spring structure in accordance with the present invention.

FIGS. 2 and 3 illustrate spring structures in alternate embodiments of the present invention. Spring structures 40 and 50 in FIGS. 2 and 3 do not include either retaining tab 4 or fixing tab 5. As explained above with reference to spring structure 10, spring structures 40 and 50 are substantially rigid with some degree of planar flexibility and elasticity.

Spring structure 40 in FIG. 2 includes base 43 and flexible elongated members 41 and 42 extending symmetrically from base 43 at acute angles. Tab 45 extends from the end of member 41, and tab 46 extends from the end of member 42. Tabs 45 and 46 hold spring structure 40 in place. In operation, tabs 45 and 46 rest against the exterior of a hole in a leveling device, such as hole 7 in FIGS. 1b–d.

In FIG. 3, spring structure 50 includes flexible elongated members 51 and 52 extending symmetrically from base 53 at acute angles. A manufacturer mounts spring 50 in a leveling device hole, such as hole 7 in FIGS. 1b–1d. Since spring 50 does not include a retaining tab, the manufacturer may place caps at the ends of hole 7 to prevent a vial from sliding through members 51 and 52.

Industrial Applicability: Accordingly, embodiments of the present invention provide a spring structure that accurately and reliably positions a bubble vial or similar type of level indicator in a leveling device or its like.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A leveling device comprising:
    a level indicator;
    a hole for receiving said level indicator;
    a spring structure mounting said level indicator in said hole, wherein said spring structure includes:
        a base,
        a first flexible elongated member extending from said base, and
        a second flexible elongated member extending from said base; and
    a second spring structure mounting said level indicator in said hole, wherein said second spring structure is aligned in said hole with a rotational displacement from said spring structure.

2. The leveling device of claim 1, wherein said level indicator is located between said first flexible elongated member and said second flexible elongated member, wherein said first flexible elongated member and said second flexible elongated member each apply a force to said level indicator.

3. The leveling device of claim 2, wherein said forces applied by said first flexible elongated member and said second flexible elongated member direct said level indicator toward a central axis of said hole.

4. The leveling device of claim 2, further including a fixing tab extending from said base, wherein an interior surface of said hole includes a notch receiving said fixing tab.

5. The leveling device of claim 2, further including:
    a screw mounted through an interior surface of said hole to extend into said hole for adjusting positioning of said level indicator.

6. The leveling device of claim 5, further including:
    a retaining tab extending from said base to retain said level indicator between said first flexible elongated member and said second flexible elongated member, wherein said retaining tab is sized to allow said level indicator to pass between said first flexible elongated member and said second flexible elongated member when said screw is retracted into said interior surface of said hole.

7. The leveling device of claim 5, wherein said screw applies a force to said level indicator.

8. The leveling device of claim 7, wherein said screw contacts said level indicator.

9. The leveling indicator of claim 7, wherein said force applied by said screw is normal to said base.

10. The leveling device of claim 5, wherein said screw does not contact said spring structure.

11. The leveling device of claim 1, wherein said second spring structure is aligned in said hole perpendicular to said spring structure.

12. The leveling device of claim 1 wherein said second spring structure includes:
    a second base,
    a third flexible elongated member extending from said base and deflected by an interior surface of said hole, and
    a fourth flexible elongated member extending from said base and deflected by an interior surface of said hole.

13. The leveling device of claim 12, wherein said level indicator is located between said third flexible elongated member and said fourth flexible elongated member, wherein said third flexible elongated member and said fourth flexible elongated member each apply a force to said level indicator.

14. The leveling device of claim 13, wherein said forces applied by said third flexible elongated member and said fourth flexible elongated member direct said level indicator toward a central axis of said hole.

15. The leveling device of claim 1, wherein:
    said first flexible elongated member is deflected by an interior surface of said hole, and
    said second flexible elongated member is deflected by an interior surface of said hole.

16. A leveling device comprising:
    a level indicator;
    a hole receiving said level indicator;
    a first spring structure mounting said level indicator in said hole, wherein said first spring structure includes:
        a base,
        a first flexible elongated member extending from said base of said first spring structure and deflected by an interior surface of said hole, and
        a second flexible elongated member extending from said base of said first spring structure and deflected by an interior surface of said hole; and
    a second spring structure mounting said level indicator in said hole, wherein said second spring structure is aligned in said hole with a rotational displacement from said first spring structure and includes:
        a base,
        a first flexible elongated member extending from said base of said second spring structure and deflected by an interior surface of said hole, and
        a second flexible elongated member extending from said base of said second spring structure and deflected by an interior surface of said hole.

17. The leveling device of claim 16, further including:
    a first screw mounted through an interior surface of said hole to extend into said hole for adjusting positioning of said level indicator; and
    a second screw mounted through an interior surface of said hole to extend into said hole for adjusting positioning of said level indicator.

18. The leveling device of claim 17, wherein said first screw is aligned normal to said base of said first spring structure and said second screw is aligned normal to said base of said second spring structure.

19. The leveling device of claim 18, wherein said first spring structure and said second spring structure are aligned in said hole, wherein said second spring structure is aligned in said hole perpendicular to said first spring structure.

20. The leveling device of claim 17, wherein said first spring structure includes a first retaining tab extending from said base of said first spring structure and said second spring structure includes a second retaining tab extending from said base of said second spring structure.

21. The leveling device of claim 20, wherein said first retaining tab is sized to allow said level indicator to pass between said first flexible elongated member of said first spring structure and said second flexible elongated member of said first spring structure when said first screw is retracted into said interior surface of said hole.

22. The leveling device of claim 17, wherein said first screw applies a first force to said level indicator and said second screw applies a second force to said level indicator.

23. A leveling device comprising:
  a level indicator;
  a hole for receiving said level indicator;
  a spring structure mounting said level indicator in said hole, wherein said spring structure includes:
    a base,
    a first flexible elongated member extending from said base, and
    a second flexible elongated member extending from said base, wherein said level indicator is located between said first flexible elongated member and said second flexible elongated member, wherein said first flexible elongated member and said second flexible elongated member each apply a force to said level indicator, wherein said forces applied by said first flexible elongated member and said second flexible elongated member direct said level indicator toward an interior surface of said hole; and
  a second spring structure mounting said level indicator in said hole, wherein said spring structure is aligned in said hole with a rotational displacement from said spring structure and includes:
    a second base,
    a third flexible elongated member extending from said second base, and
    a fourth flexible elongated member extending from said second base, wherein said level indicator is located between said third flexible elongated member and said fourth flexible elongated member, wherein said third flexible elongated member and said fourth flexible elongated member each apply a force to said level indicator, wherein said forces applied by said third flexible elongated member and said fourth flexible elongated member direct said level indicator toward an interior surface of said hole.

24. The leveling device of claim 23, including a screw mounted through an interior surface of said hole to extend into said hole and apply a force to said level indicator.

25. An apparatus for securing and aligning an elongated level indicator in a cylindrical hole comprising:
  a first self-centering spring structure, said spring structure has a plurality of elongated flexible members adapted to support and apply a lateral force against a level indicator; and
  a second self-centering spring structure near an opposite end of the level indicator from said first self-centering spring structure, and oriented with a rotational displacement from the first self-centering spring structure.

26. The apparatus of claim 25, further including a screw adapted to apply a restoring force against the level indicator, therein allowing adjustment of the level indicator.

27. A method for securing and aligning level indicators comprising the steps of:
  inserting a first self-centering spring structure into a cylindrical hole near one end of the level indicator, said first self-centering spring structure having a plurality of elongated flexible members supporting and applying a force to said level indicator; and
  inserting a second self-centering spring structure into the cylindrical hole near an opposite end of the level indicator from said first self-centering spring, and oriented with a rotational displacement from the first self-centering spring structure.

28. The method of claim 27 further including using a screw adapted to apply a restoring force against the level indicator, therein allowing adjustment of the level indicator.

29. A leveling device comprising:
  a level indicator;
  a hole for receiving said level indicator;
  a spring structure mounting said level indicator in said hole, wherein said spring structure includes:
    a base,
    a first flexible elongated member extending from said base and deflected by an interior surface of said hole, and
    a second flexible elongated member extending from said base and deflected by an interior surface of said hole; and
  a screw mounted through an interior surface of said hole to extend into said hole for adjusting positioning of said level indicator,
  wherein said level indicator is located between said first flexible elongated member and said second flexible elongated member,
  wherein said first flexible elongated member and said second flexible elongated member each apply a force to said level indicator,
  wherein said screw contacts said level indicator and applies a force to said level indicator.

* * * * *